US012705874B2

(12) United States Patent
Tschannen et al.

(10) Patent No.: US 12,705,874 B2
(45) Date of Patent: Aug. 11, 2026

(54) PIXEL-BASED MACHINE-LEARNED MODELS FOR MULTIMODAL VISION-LANGUAGE TASKS

(71) Applicant: Google LLC, Mountain View, CA (US)

(72) Inventors: Michael Tobias Tschannen, Zurich (CH); Neil Matthew Tinmouth Houlsby, Zurich (CH); Basil Mustafa, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 317 days.

(21) Appl. No.: 18/513,031

(22) Filed: Nov. 17, 2023

(65) Prior Publication Data

US 2024/0169629 A1 May 23, 2024

Related U.S. Application Data

(60) Provisional application No. 63/427,434, filed on Nov. 22, 2022.

(51) Int. Cl.

| | |
|---|---|
| ***G06T 11/60*** | (2026.01) |
| ***G06F 40/284*** | (2020.01) |
| ***G06V 10/74*** | (2022.01) |
| ***G06V 10/764*** | (2022.01) |
| ***G06V 10/774*** | (2022.01) |
| ***G06V 10/776*** | (2022.01) |

(Continued)

(52) U.S. Cl.

CPC ............ *G06T 11/60* (2013.01); *G06F 40/284* (2020.01); *G06V 10/761* (2022.01); *G06V 10/764* (2022.01); *G06V 10/774* (2022.01); *G06V 10/776* (2022.01); *G06V 20/70* (2022.01); *G06V 10/945* (2022.01)

(58) Field of Classification Search

CPC ..... G06T 11/60; G06F 40/284; G06V 10/761; G06V 10/764; G06V 10/774; G06V 10/776; G06V 20/70; G06V 10/945; G06V 10/82

See application file for complete search history.

(56) References Cited

U.S. PATENT DOCUMENTS

| | | | | |
|---|---|---|---|---|
| 2015/0234812 | A1* | 8/2015 | Vukosavljevic | G06F 40/103 704/2 |
| 2017/0358064 | A1* | 12/2017 | Hendry | G06T 5/92 |
| 2020/0311798 | A1* | 10/2020 | Forsyth | G06N 3/04 |

(Continued)

OTHER PUBLICATIONS

Jia et al., "Scaling Up Visual and Vision-Language Representation Learning with Noisy Text Supervision.", arXiv:2102.05918v2, Jun. 11, 2021, 14 pages.

(Continued)

*Primary Examiner* — Wassim Mahrouka

(74) *Attorney, Agent, or Firm* — DORITY & MANNING P.A.

(57) ABSTRACT

A first image and textual content associated with the first image is obtained. A second image that depicts the textual content associated with the first image is rendered. The first image and the second image are processed with a machine-learned encoding model to respectively obtain a first image embedding and a second image embedding for an image embedding space including a plurality of image embeddings. The machine-learned encoding model is trained based on a difference between the first image embedding and the second image embedding.

20 Claims, 6 Drawing Sheets

(51) Int. Cl.
*G06V 10/94* (2022.01)
*G06V 20/70* (2022.01)

(56) References Cited

U.S. PATENT DOCUMENTS

| | | | | |
|---|---|---|---|---|
| 2022/0012297 | A1 * | 1/2022 | Basu | G06N 3/045 |
| 2023/0401491 | A1 * | 12/2023 | Betthauser | G06N 3/0985 |
| 2025/0069280 | A1 * | 2/2025 | Zhao | G06F 40/279 |

OTHER PUBLICATIONS

Radford et al., "Learning Transferable Visual Models from Natural Language Supervision.", Thirty-eighth International Conference on Machine Learning, Virtual, Jul. 18-24, 2021, 16 pages.
Rust et al., "Language Modelling with Pixels.", arXiv:2207.06991v1, Apr. 26, 2023, 35 pages.

* cited by examiner

PIXEL-BASED MACHINE-LEARNED MODELS FOR MULTIMODAL VISION-LANGUAGE TASKS

PRIORITY CLAIM

The present application is based on and claims priority to U.S. Provisional Application 63/427,434 having a filing date of Nov. 22, 2022, which is incorporated by reference herein.

FIELD

The present disclosure relates generally to machine-learned models. More particularly, the present disclosure relates to exclusively pixel-based machine-learned encoding models for multimodal computer vision and/or language tasks.

BACKGROUND

Recently, large-scale, multimodal training of large machine-learned models (e.g., transformer-based models), etc. has led to improvements in many different domains, such as computer vision, language understanding, audio processing, etc. For example, in the domain of computer vision tasks, a single large pre-trained machine-learned model (e.g., a deep learning model) can often outperform multiple smaller, task-specific models.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for pixel-based machine-learned models for multimodal vision-language tasks. The method includes obtaining a first image and textual content associated with the first image. The method includes rendering a second image that depicts the textual content associated with the first image. The method includes processing the first image and the second image with a machine-learned encoding model to respectively obtain a first image embedding and a second image embedding for an image embedding space comprising a plurality of image embeddings. The method includes training the machine-learned encoding model based on a difference between the first image embedding and the second image embedding.

Another aspect of the present disclosure is directed to a computing system for pixel-based machine-learned models for multimodal vision-language tasks. The computing system includes one or more processors. The computing system includes one or more tangible, non-transitory computer readable media storing computer-readable instructions that when executed by the one or more processors cause the one or more processors to perform operations. The operations include obtaining a first image and textual content associated with the first image. The operations include rendering a second image that comprises the first image and a rendering of the textual content associated with the first image. The operations include processing the second image with a machine-learned image transformer model to obtain an image embedding of the second image for an image embedding space, wherein the image embedding space comprises a plurality of image embeddings generated using the machine-learned image transformer model. The operations include retrieving one or more image embeddings from the image embedding space based on a similarity between the one or more image embeddings and the image embedding of the second image. The operations include using the one or more image embeddings to perform a task associated with at least one of the first image or the textual content associated with the first image.

Another example aspect of the present disclosure is directed to one or more tangible, non-transitory computer readable media storing computer-readable instructions that when executed by one or more processors cause the one or more processors to perform operations. The operations include obtaining textual content from a requesting entity. The operations include generating an image that depicts a rendering of the textual content. The operations include processing the image with a machine-learned image transformer model to obtain an image embedding of the image for an image embedding space, wherein the image embedding space comprises a plurality of image embeddings generated using the machine-learned image transformer model. The operations include retrieving one or more image embeddings of the plurality of image embeddings from the image embedding space based on a similarity between the one or image embeddings and the image embedding of the image. The operations include providing one or more images respectively associated with the one or more image embeddings to the requesting entity.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
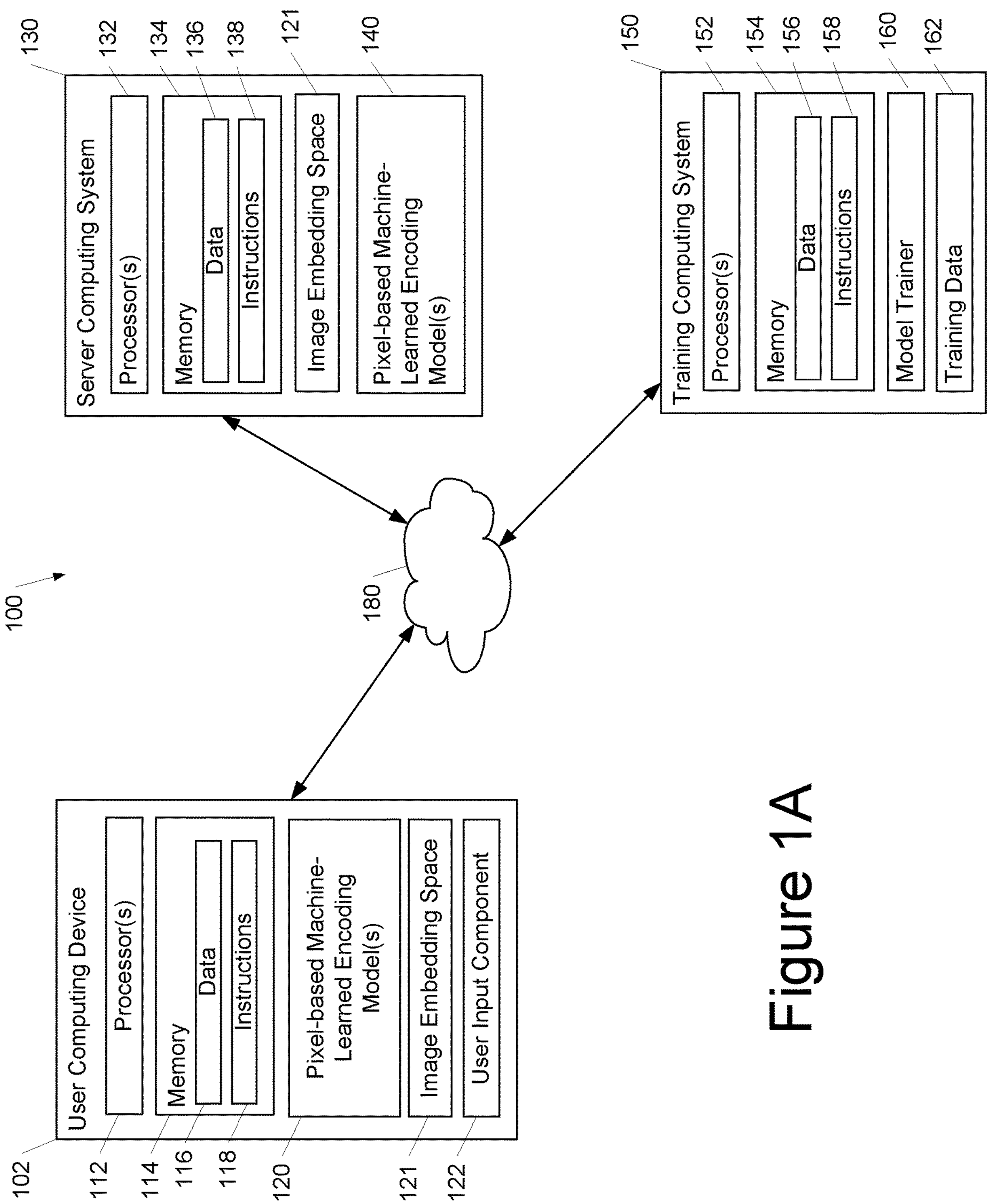
FIG. 1A depicts a block diagram of an example computing system 100 that performs training of a pixel-based machine-learned encoding model for multimodal vision-language tasks according to example embodiments of the present disclosure.

Reference numerals that are repeated across plural figures are intended to identify the same features in various implementations.

DETAILED DESCRIPTION

Overview

Generally, the present disclosure is directed to machine-learned models. More particularly, the present disclosure relates to exclusively pixel-based machine-learned encoding models for multimodal vision-language tasks. For example, a computing system can obtain a first image (e.g., an image depicting an animal, etc.) and textual content associated with the first image (e.g., a description of the species of animal, characteristics of the animal, etc.). The computing system can render an image that depicts the textual content associated with the first image. The computing system can process the first image and the second image with a machine-learned encoding model (e.g., a machine-learned image transformer model, etc.). The machine-learned encoding model can be a model that exclusively processes image data (e.g., pixels, etc.).

By processing the first and second images with the machine-learned encoding model, a first image embedding and a second image embedding can be obtained for an image embedding space. The image embedding space can include a plurality of image embeddings. The computing system can train the machine-learned encoding model based on a difference between the first image embedding and the second image embedding. For example, the computing system may utilize a contrastive learning process that minimizes a difference between the first image embedding and the second image embedding, and maximizes a difference between the pair of the first and second image embeddings and the rest of the image embeddings within the image embedding space. Once trained, the computing system can utilize the machine-learned encoding model to perform visual tasks, language tasks, or multimodal vision-language tasks. For example, the computing system can use the model to generate an image embedding from an image, renderings of textual content, or a combination of both, and then use the image embedding in conjunction with the image embedding space to perform various vision/language tasks (e.g., semantic image analysis, sentence classification, answer retrieval, image classification, etc.).

Aspects of the present disclosure provide a number of technical effects and benefits. As one example technical effect and benefit, conventional machine-learned models generally include a discrete model component for each modality of a multimodal task such as vision-language tasks. For example, many conventional models for vision-language tasks include an image encoder and a text encoder. As each discrete model component requires its own set of parameters, values, etc., the training of each model component incurs a substantial cost in computing resources (e.g., power, memory, bandwidth, compute cycles, storage, etc.). However, aspects of the present disclosure facilitate multimodal vision-language tasks with a single machine-learned model via rendering of textual content as an image, therefore eliminating the computing resource cost associated with training of multiple model components (e.g., discrete image and text encoders, etc.).

For another example, as described previously, conventional models generally utilize discrete image encoders and text encoders for multimodal vision-language tasks. However, text encoders often require extensive pre-processing of textual content before it can be properly processed by the text encoder. For example, many text encoders can only process token representations generated from the textual content, which requires the expenditure of substantial quantities of computing resources. Furthermore, many text encoders are language-specific, and require that textual content first be translated to the language in which the encoder was trained before processing. This translation also requires substantial quantities of computing resources, and introduces a considerable vector for decreasing model accuracy due to the errors, inaccuracies, and mistranslations inherent to machine translation of languages. For example, it can be challenging to tokenize certain language as the quantity of tokens available for tokenization is often limited. However, aspects of the present disclosure facilitate language-agnostic processing of textual content. In particular, by rendering textual content to an image, the machine-learned encoding models of the present disclosure can be trained to generate accurate embeddings without requiring any pre-processing of textual content (e.g., tokenization, machine translation, etc.), therefore generating more accurate results and eliminating the expenditure of computing resources for pre-processing that is required by conventional techniques.

With reference now to the Figures, example embodiments of the present disclosure will be discussed in further detail.

Example Devices and Systems

FIG. 1A depicts a block diagram of an example computing system 100 that performs training of a pixel-based machine-learned encoding model for multimodal vision-language tasks according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more pixel-based machine-learned encoding models 120. For example, the pixel-based machine-learned encoding models 120 can be or can otherwise include various machine-learned models such as neural networks (e.g., deep neural networks) or other types of machine-learned models, including non-linear models and/ or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example pixel-based machine-learned encoding models 120 are discussed with reference to FIGS. 2-3.

In some implementations, the one or more pixel-based machine-learned encoding models 120 can be received from the server computing system 130 over network 180, stored in the user computing device memory 114, and then used or otherwise implemented by the one or more processors 112. In some implementations, the user computing device 102 can implement multiple parallel instances of a single pixel-based machine-learned encoding model 120 (e.g., to perform parallel multimodal vision-language tasks across multiple instances of the pixel-based machine-learned encoding model).

More particularly, the pixel-based machine-learned encoding model 120 can be trained and utilized to perform computer vision tasks, language tasks, and multimodal vision-language tasks. In particular, the pixel-based machine-learned encoding model 120 can process image data (e.g., pixels, etc.) alongside textual content rendered as image data, to perform multimodal vision-language tasks. For example, textual content rendered as an image can be processed by the pixel-based machine-learned encoding model 120 to obtain an image embedding. The image embedding can be used to retrieve other image embeddings from image embedding space 121. The image embedding space can include a plurality of other image embeddings. For example, the pixel-based machine-learned encoding model 120 may process large numbers of images, or pairs of images (e.g., two similar images, a first image and a rendering of textual content descriptive of the first image, etc.) to populate the image embedding space 121. The retrieved image embeddings can be utilized to perform various multimodal vision-language tasks (e.g., textual classification, image classification, semantic text and/or image analysis, image retrieval, answer retrieval, etc.).

Additionally or alternatively, one or more pixel-based machine-learned encoding model 140 can be included in or otherwise stored and implemented by the server computing system 130 that communicates with the user computing device 102 according to a client-server relationship. For example, the pixel-based machine-learned encoding models 140 can be implemented by the server computing system 130 as a portion of a web service (e.g., a multimodal vision-language service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more pixel-based machine-learned encoding models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 2-3.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the pixel-based machine-learned encoding models 120 and/or 140 based on a set of training data 162. The training data 162 can include, for example, a corpus of images and textual content that is associated with. For example, the corpus of images may include an image that depicts a giraffe. The textual content associated with the image may describe various characteristics of that particular giraffe or giraffes in general (e.g., height, weight, age, details regarding of the environment in which the image was captured, average lifespan, etc.). The model trainer 160 can generate a second image that includes a rendering of the textual content (e.g., rendering an image with the textual content, etc.). The model trainer 160 can process the image and the second image with the model(s) 120/140 to obtain a first image embedding and a second image embedding.

The model trainer 160 can train the model(s) 120/140 based on a difference between the first image embedding and the second image embedding. For example, the model trainer 160 may evaluate a contrastive loss function that minimizes the difference between the first image embedding and the second image embedding and maximizes the difference between (a) the pair of image embeddings including the first and second image embeddings and (b) the plurality of image embeddings in the image embedding space 121. In other words, the contrastive loss function maximizes the similarity between the first image embedding and the second image embedding and minimizes the similarity between the first/second image embeddings and the other image embeddings in the embedding space. In such fashion, the model trainer 160 can train the model(s) 120/140 to perform multimodal vision-language tasks.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the image data can depict text or natural language data. For example, the image data may include a rendering of the text or natural language data. The machine-learned model(s) can process the image data that depicts the text or natural language data to generate an output. As an example, the machine-learned model(s) can process the image data that depicts the natural language data to generate a language encoding output. As another example, the machine-learned model(s) can process the image data that depicts the text or natural language data to generate a latent text embedding output. As another example, the machine-learned model(s) can process the image data that depicts the text or natural language data to generate a translation output. As another example, the machine-learned model(s) can process the image data that depicts the text or natural language data to generate a classification output. As another example, the machine-learned model(s) can process the image data that depicts the text or natural language data to generate a textual segmentation output. As another example, the machine-learned model(s) can process the image data that depicts the text or natural language data to generate a semantic intent output. As another example, the machine-learned model(s) can process the image data that depicts the text or natural language data to generate an upscaled text or natural language output (e.g., text or natural language data that is higher quality than the input text or natural language, etc.). As another example, the machine-learned model(s) can process the image data that depicts the text or natural language data to generate a prediction output.

In some implementations, the input to the machine-learned model(s) of the present disclosure can be image data that depicts speech data. The machine-learned model(s) can process the image data that depicts the speech data to generate an output. As an example, the machine-learned model(s) can process the image data that depicts the speech data to generate a speech recognition output. As another example, the machine-learned model(s) can process the image data that depicts the speech data to generate a speech translation output. As another example, the machine-learned model(s) can process the image data that depicts the speech data to generate a latent embedding output. As another example, the machine-learned model(s) can process the image data that depicts the speech data to generate an encoded speech output (e.g., an encoded and/or compressed representation of the speech data, etc.). As another example, the machine-learned model(s) can process the image data that depicts the speech data to generate an upscaled speech output (e.g., speech data that is higher quality than the input speech data, etc.). As another example, the machine-learned model(s) can process the image data that depicts the speech data to generate a textual representation output (e.g., a textual representation of the input speech data, etc.). As another example, the machine-learned model(s) can process the image data that depicts the speech data to generate a prediction output.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
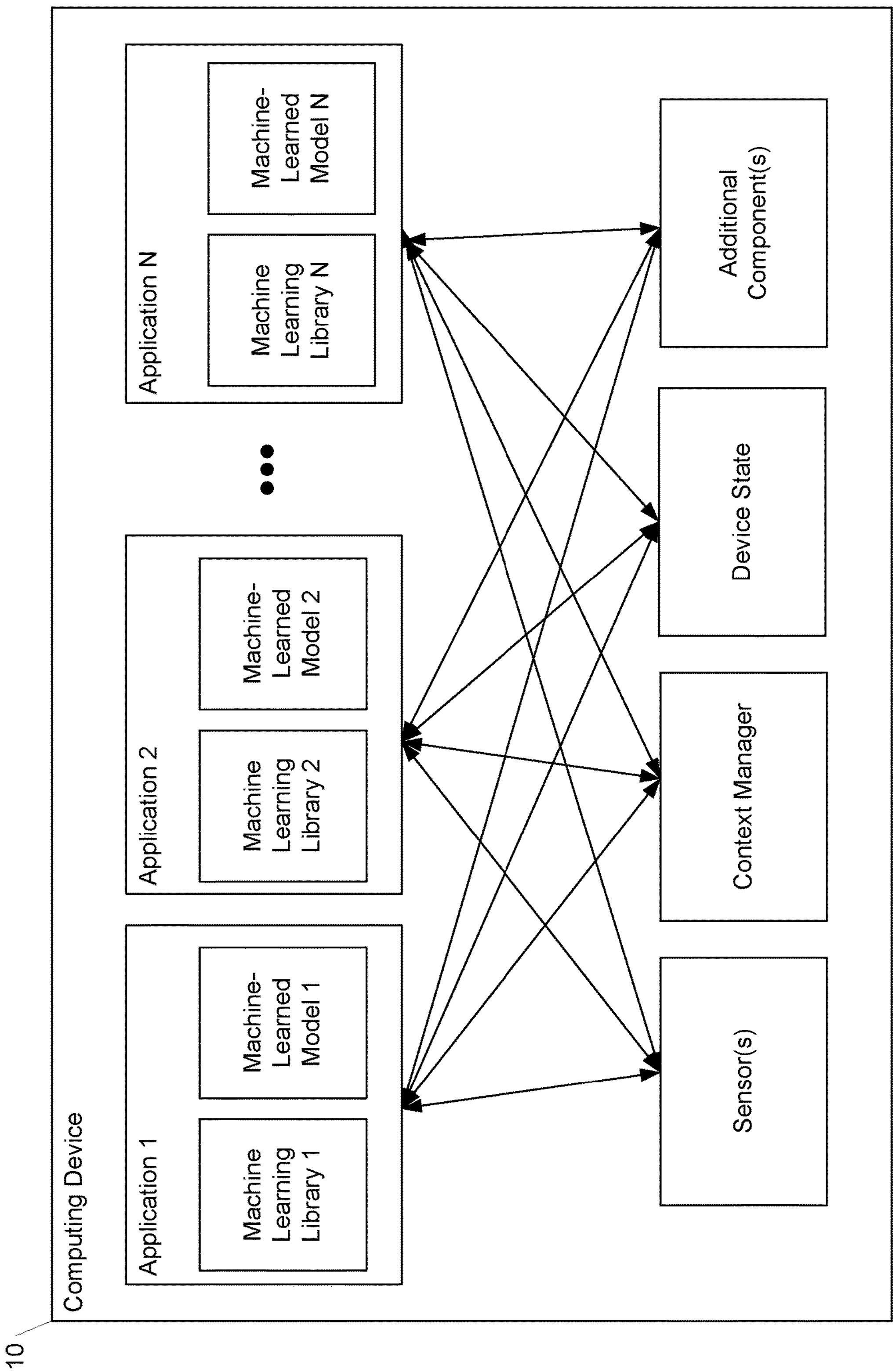
FIG. 1B depicts a block diagram of an example computing device 10 that performs training of a pixel-based machine-learned encoding model for multimodal vision-language tasks according to example embodiments of the present disclosure.

FIG. 1B depicts a block diagram of an example computing device 10 that performs training of a pixel-based machine-learned encoding model for multimodal vision-language tasks according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
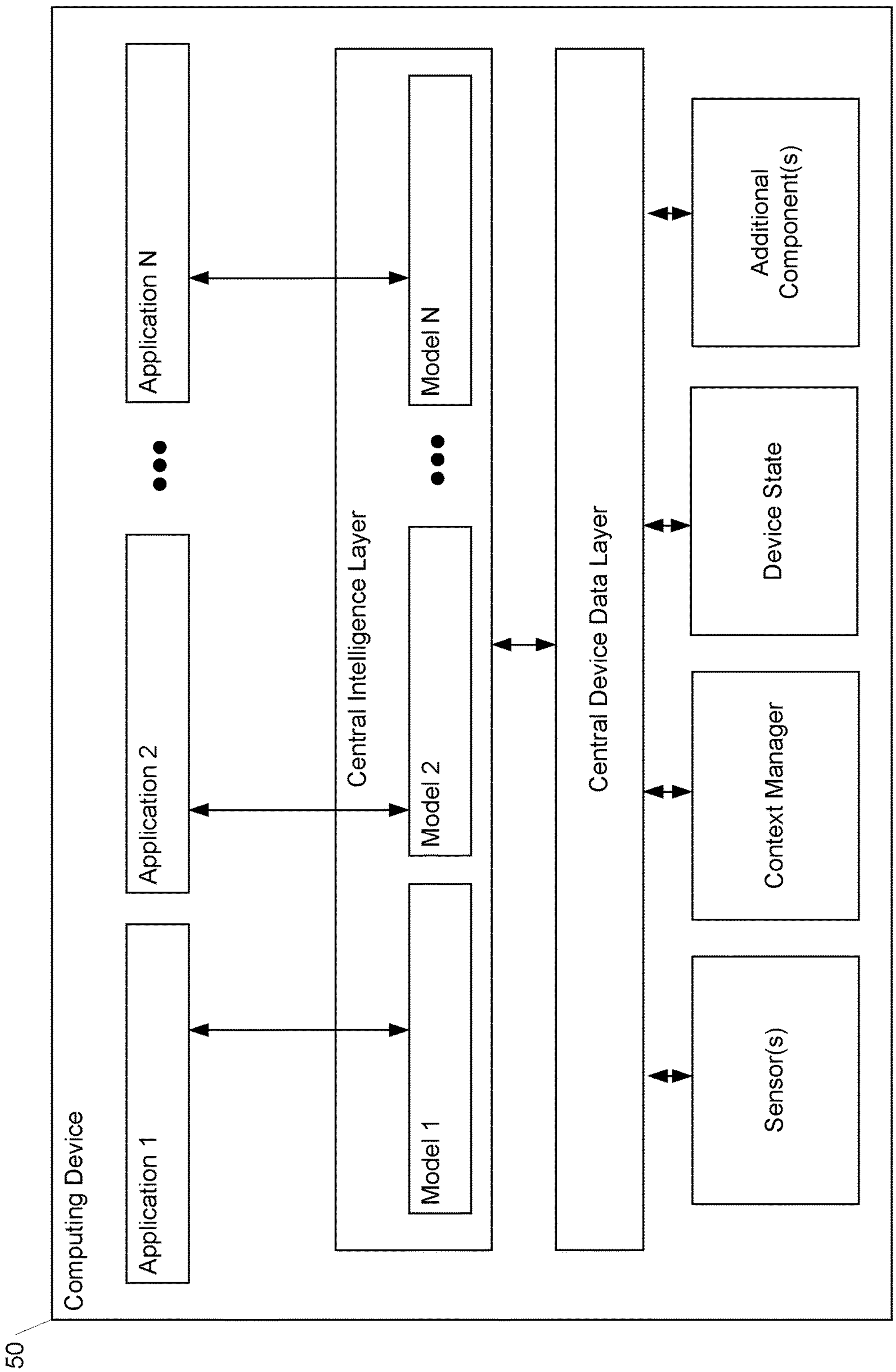
FIG. 1C depicts a block diagram of an example computing device 50 that performs multimodal vision-language tasks using a pixel-based machine-learned encoding model according to example embodiments of the present disclosure.

FIG. 1C depicts a block diagram of an example computing device 50 that performs multimodal vision-language tasks using a pixel-based machine-learned encoding model according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 2:
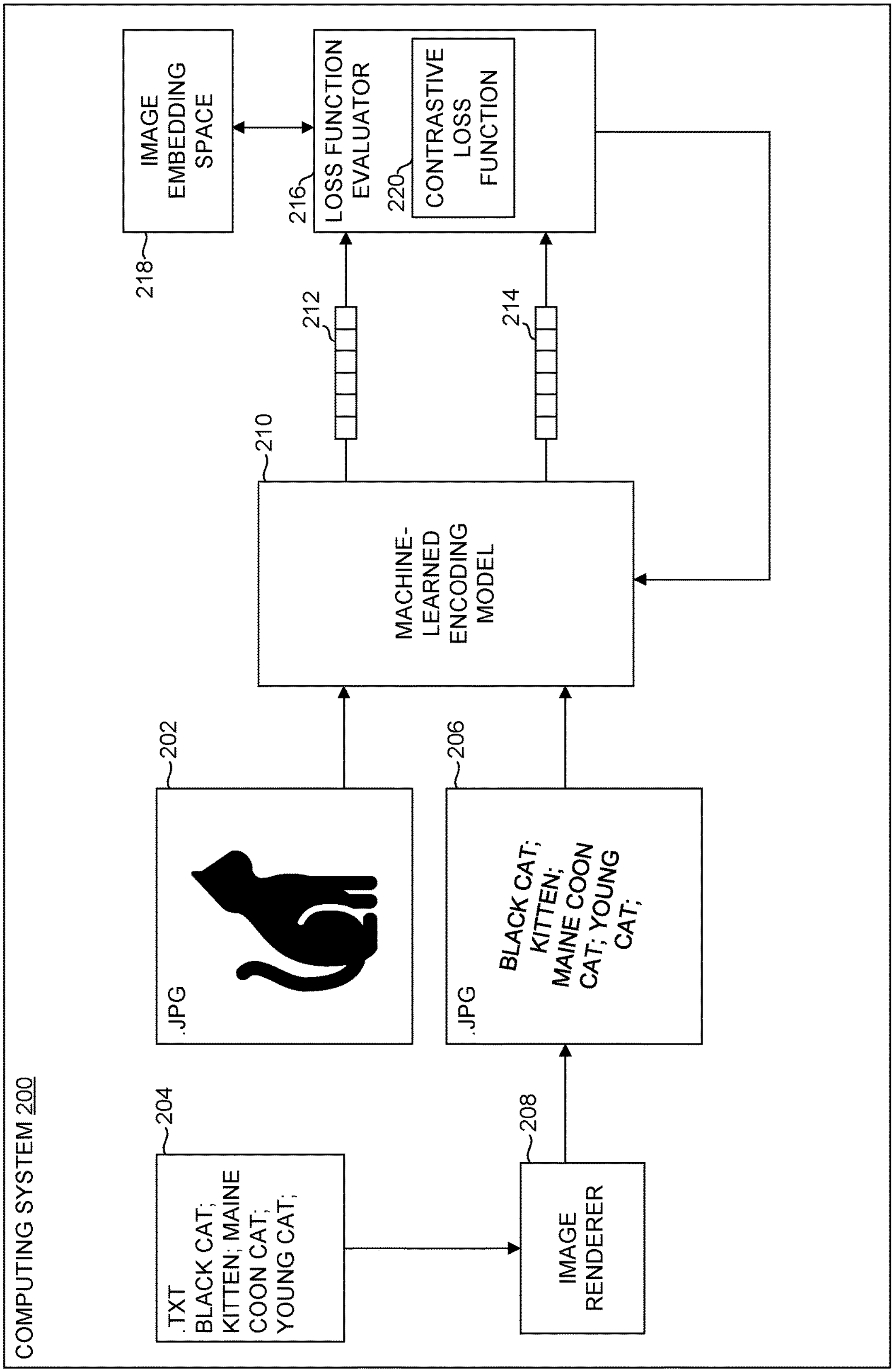
FIG. 2 depicts a data flow diagram for training a pixel-based machine-learned encoding model according to some embodiments of the present disclosure.

FIG. 2 depicts a data flow diagram for training a pixel-based machine-learned encoding model according to some embodiments of the present disclosure. More specifically, a computing system 200 (e.g., user computing device 102, server computing system 130, training computer system 150 of FIG. 1A, etc.), can obtain an image 202 and textual content 204 associated with the image 202. For example, the image 202 and textual content 204 may be obtained from a corpus of training data for training of models for multimodal vision-language tasks (e.g., training dataset 162 of FIG. 1A, etc.). In some implementations, the image 202 and textual content 204 may be extracted via various web crawling techniques. For example, an image search can be performed (e.g., using an image search engine) and pairs of images and their associated metadata (e.g., alt-text descriptions, etc.) can be extracted to form the corpus of training data. For example, an image search may be performed for aircraft carriers. An image (e.g., an image of the U.S.S. Midway) and an associated alt-text description (e.g., "*The Midway after commissioning in September* 1945") can be extracted from a website related to aircraft carriers using any type or manner of web crewing technique. The pair of the image and the alt-text description can be included in a corpus of training data.

The computing system 200 can generate an image 206 that includes a rendering of the textual content 204. For example, the computing system 200 may utilize image renderer 208 to render the image 206. It should be noted that the images 202 and/or 206 may be rendered using any type or manner of image format. For example, the image 202 may be rendered in a graphics interchange format (GIF) and the image 206 may be rendered in a joint photographic expert group (JPEG) format.

It should be noted that the appearance of the textual content 204 as rendered to image 206 is chosen only to more clearly depict that the textual content 204 has, in fact, been rendered, and is not native text. Rather, the textual content 204 can be rendered to the image 206 in any manner that facilitates various implementations of the present disclosure. In particular, the textual content depicted in image 206 is depicted as being rendered at a slanted angle. However, implementations of the present disclosure may also render the textual content of the image 206 at the center of the image 206 without any degree of slant. Alternatively, in some implementations, the computing system 200 may render the textual content 204 to the image 206 at a location other than the center of the image 206. As such, it should be broadly understood that the textual content 204 can be rendered to the image 206 in any type or manner of font, positioning, slant, format, thickness, color, dimension (e.g., three-dimensional or pseudo three-dimensional text, etc.), etc.).

The machine-learned encoding model 210 can process the image 202 to obtain a first image embedding 212, and can process the image 206 to obtain a second image embedding 214. In particular, it should be noted that the machine-learned encoding model 210 can be a pixel-specific model that is trained exclusively to process images data (e.g., data that includes or otherwise describes the pixels that constitute an image, etc.). In some implementations, the machine-learned encoding model 210 can be a machine-learned image transformer model.

The computing system can utilize loss function evaluator 216 to train the machine-learned encoding model 210. In particular, the loss function evaluator 216 can train the machine-learned encoding model 210 based on a difference between the first image embedding 212 and the second image embedding 214. In some implementations, the difference between the first image embedding and the second image embedding may refer to a degree of similarity between the image embeddings 212/214. For example, the computing system 200 may train the machine-learned encoding model 210 such as to increase the degree of similarity between the image embedding 212 and the image embedding 214.

In some implementations, the loss function evaluator 216 may evaluate a loss function that evaluates (a) a difference between the first image embedding 212 and the second image embedding 214, and (b) the pair of image embeddings 212/214 and a plurality of images included in the image embedding space 218. In other words, the loss function can maximize the similarity between the first image embedding 212 and the second image embedding 214, and can minimize the similarity between the first/second image embeddings 212/214 and the other image embeddings in the embedding space 218.

For example, the loss function evaluated by the loss function evaluator 216 may be a contrastive loss function 220. When evaluated, the contrastive loss function can maximize a difference between the first image embedding 212 and the second image embedding 214. The contrastive loss function 220 can also maximize a difference between the pair of image embeddings 212/214 and the plurality of image embeddings within the image embedding space 218. In such fashion, the contrastive loss function 220 can be utilized by the computing system 200 in conjunction with the loss function evaluator 216 to train the machine-learned encoding model 210 for multimodal vision-language tasks.

Although the image 202 is not depicted as including text, it should be noted that in some implementations the image 202 may also include a rendering of textual content. For example, as depicted, the image 202 depicts a black cat. The textual content 204 includes descriptors for the black cat depicted in image 202 (e.g., "black cat", "kitten", "maine coon cat", young cat", etc.). However, in some implementations, the image 202 may also include textual content. For example, the image 202 may include textual content that describes a source of the image 202 (e.g., "this image was retrieved from catpics.com").

As described, the computing system 200 can be trained to perform multimodal vision-language tasks. In particular, to do so, text inputs (e.g., textual content) is rendered on blank images, and subsequently dealt with entirely as images, including the initial patch embedding. By training the machine-learned encoding model 210 (e.g., a single vision transformer) contrastively, we obtain a single vision transformer model 210 that can understand both images and text through the single interface of vision and provides a single representation which can be used to solve image, image-language, and pure language understanding tasks. In particular, as described, the machine-learned model 210 can be trained by considering positive pairs of consecutive sentences sampled from a text corpus, pairs of translated sentences for different languages, pairs of back-translated sentences, as well as pairs of sentences with word dropout. Such text/text pairs can seamlessly be integrated into the contrastive training by supplementing batches of image/alt-texts with pairs of (rendered) text/text pairs.

Furthermore, alongside multimodal versatility, training and utilization of the machine-learned encoding model 210 according to implementations of the present disclosure alleviates common hurdles with text processing, namely the development of an appropriate tokenizer and vocabulary. This is particularly interesting in the context of a massively multilingual setup, where the text encoder has to handle dozens of languages.

Figure 3:
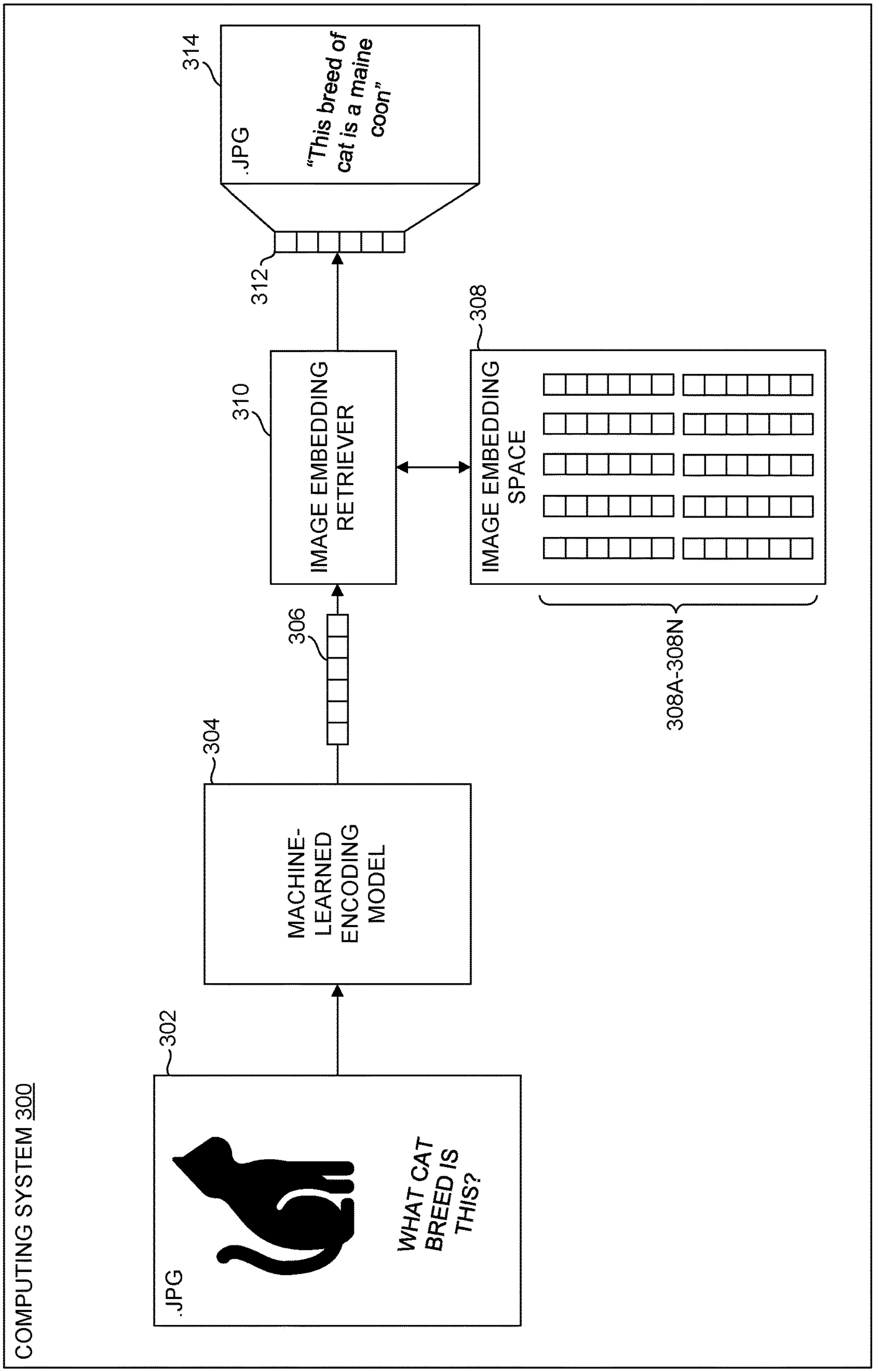
FIG. 3 depicts a data flow diagram for performing multimodal vision-language tasks using a trained pixel-based machine-learned encoding model according to some embodiments of the present disclosure.

FIG. 3 depicts a data flow diagram for performing multimodal vision-language tasks using a trained pixel-based machine-learned encoding model according to some embodiments of the present disclosure. More specifically, a computing system 300 can obtain an image 302. The image 302 can include a rendering of textual content. For example, the computing system 300 may obtain an image (e.g., an image that depicts a cat) and textual content descriptive of the image. The computing system 300 may then generate an image that includes a rendering of the textual content, and then form an image 302 that includes both the image and the rendering of the textual content. Alternatively, the computing system 300 may render the textual content directly to the obtained image to form the image 302. The computing system 300 can include a trained machine-learned encoding model 304 (e.g., training for multimodal vision-language tasks as described with regards to FIG. 2, etc.). The computing system 300 can process the image 302 with the machine-learned encoding model 304 to obtain an image embedding 306. The image embedding 306 can be any type or manner of encoding of the information of the image 302.

The computing system 300 can include an image embedding space 308 (e.g., a collection of image embeddings that collectively from an image embedding space). The image embedding space 308 can include a plurality of image embeddings 308A-308N. For example, prior to processing the image 302 with the machine-learned encoding model 304, the computing system 300 may process a large number of images with the machine-learned encoding model 304 to obtain the image embeddings 308A-308N, and then store the image embeddings 308A-308N within the image embedding space 308. In some implementations, some of the image embeddings 308A-308N may be embeddings of images that are, or otherwise include, renderings of textual content. For example, image embedding 308A may be an image embedding of an image that depicts a dog. Image embedding 308B may be an embedding of an image that includes a rendering of corresponding textual content that describes the dog (e.g., "black dog; large dog; german shepherd", etc.).

In some implementations, the computing system 300 can retrieve an image embedding 312 of the plurality of image embeddings 308A-308N from the image embedding space 308. For example, the computing system 300 may utilize image embedding retriever 310 to retrieve the image embedding 312. The image embedding retriever 310 may retrieve the image embedding 312 based on a similarity between the image embedding 312 and the image embedding 306.

For example, the image embedding retriever 310 may be instructed by the computing system 300 to select a single image embedding 312 from the plurality of image embeddings 308A-308N that is most similar to the image embedding 306. The image embedding 312 may be an embedding of an image 314 that is a rendering of textual content associated with the image 302. The image embedding retriever 310 may determine that the image embedding 312 is most similar to the image embedding 306 of the plurality of image embeddings 308A-308N.

It should be noted that, although the image 314 from which the image embedding 312 is generated is depicted in FIG. 3, the image 314 is not necessarily stored within the image embedding space 308, or the computing system 300 at all. Rather, in some implementations, the computing system 300 may obtain the image 314 after retrieving the image embedding 312, and then provide the image 314. For example, the computing system 300 may obtain textual content from a requesting entity (e.g., a user of a user computing device, etc.). The textual content may include a query from the user (e.g., "what cat breed is this?"). As depicted, the computing system 300 can render the query as an image to form the image 302. The computing system can retrieve the image embedding 312 as previously described, can obtain the image 314 respectively associated with the image embedding 312, and can provide the image 314 to the requesting entity. For example, the image embedding 312 may indicate a location from which the image 314 can be retrieved (e.g., a file repository, etc.). For another example, the computing system 300 may process the image embedding 312 with a generative machine-learned model to generate the image 314 (or a reconstruction of the image 314) (e.g., using a machine-learned decoding model trained concurrently or subsequently with the machine-learned encoding model, etc.).

It should be noted that, as depicted, the image embedding 306 can encode specific characteristics of entities depicted within the image 302 as well as the textual content depicted within the image 302. For example, as depicted, the textual content rendered in image 302 can be a query (e.g., "what cat breed is this?"). The entity depicted in the image 302 can be a specific breed of cat (e.g., a maine coon cat). The machine-learned encoding model 304 can generate the image embedding 306 such that the image embedding 312 retrieved based on its similarity to the image embedding 306 shares features of both the textual content and the entity of the image 302. For example, as depicted, the image 314 associated with image embedding 312 is an answer to a query of the textual content of image 302 that is specific to the breed of the cat depicted in the image 302. In such fashion, the machine-learned encoding model 304 can generate image embeddings (e.g., image embedding 306) that are sufficiently detailed to enable complex multimodal vision-language tasks, such as answering multimodal queries.

Additionally, in some implementations, the textual content may also include possible answers that are all rendered as a single image. For example, a prediction submodel can be added to the machine-learned encoding model that is configured to predict a correct answer from a series of given possible answers. The textual content rendered to image 302 may be "what cat breed is this? A) maine coon; B) siamese; C) tabby cat; d) Ragdoll). The image embedding 306 can be generated from this image, and the image embedding retriever 310 can retrieve an image embedding 312 that selects one of the four multiple choice questions. In such fashion, the machine-learned encoding model 304 and the included prediction submodel can be trained to predict the correct answer of the four answers.

It should be noted that, although the textual content rendered in image 302 is written in the same language as the textual content rendered in image 314, it is not necessary that the textual content of image 302 and the images respectively associated with image embeddings 308A-308N is all written in the same language. Rather, if the query depicted in image 302 was written in a language different than the language of the answer depicted in image 314, the image embedding 312 may still be sufficiently similar to the image embedding 306 as to be retrieved by the image embedding retriever 310.

It should be noted that, although the machine-learned encoding model 304 can facilitate multimodal query tasks (e.g., answer retrieval tasks), it is not limited to such tasks. Rather, the image embeddings generated using machine-learned encoding model 304 can be utilized in a variety of vision tasks, language tasks, and multimodal vision-language tasks (e.g., language translation tasks, a textual classification task that classifies textual content depicted by the third image, an image classification task that classifies the third image, a semantic analysis task that generates a semantic output for the third image, an image retrieval task, etc.). For example, the image 314 that is associated with image embedding 312 depicts textual content associated with image 302. However, if computing system performs a task to retrieve semantically similar images to that of image 302, the computing system may utilize the image embedding retriever to retrieve a large number of image embeddings 308A-308N from the image embedding space 308 that are respectively associated with images semantically similar to image 302 (e.g., images depicting elderly cats, etc.).

Example Methods

Figure 4:
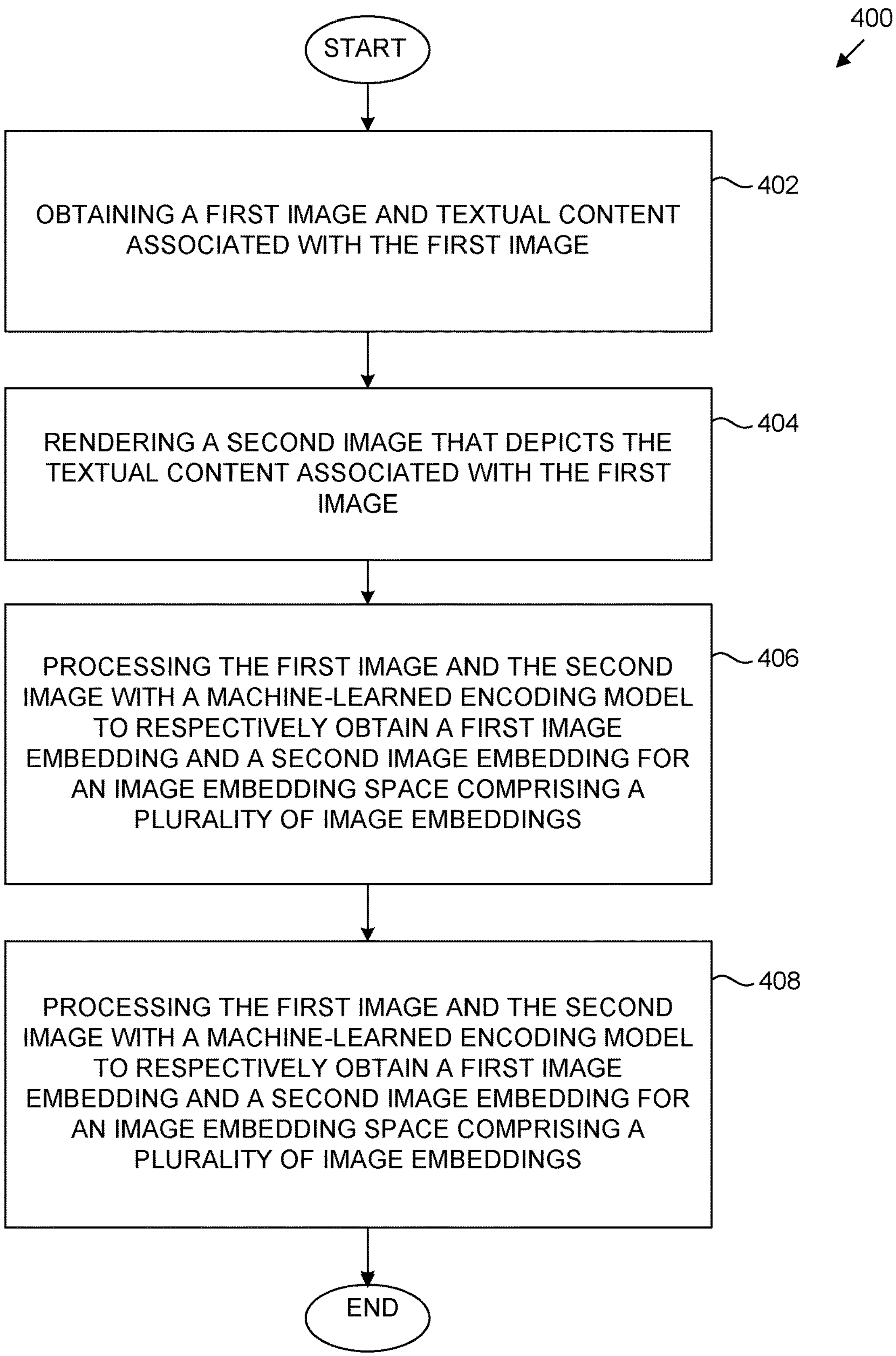
FIG. 4 depicts a flow chart diagram of an example method to perform according to example embodiments of the present disclosure.

FIG. 4 depicts a flow chart diagram of an example method to perform according to example embodiments of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At 402, a computing system obtains a first image and textual content associated with the first image. In some implementations, the first image includes a rendering of additional textual content different from the textual content associated with the first image. In some implementations, the additional textual content is written in a first language, and wherein the textual content associated with the first image is written in a second language different from the first language. In some implementations, the textual content is descriptive of the first image.

At 404, the computing system renders a second image that includes the first image and a rendering of the textual content associated with the first image. In some implementations, rendering the second image that depicts the textual content associated with the first image includes modifying the textual content associated with the first image to obtain modified textual content, and rendering a second image that depicts the modified textual content. Additionally, or alternatively, in some implementations, the textual content is descriptive of the first image. For example, if the first image depicts a sunset on the beach, the textual content may describe characteristics of the sunset on the beach (e.g., "image depicts beach sunset; image captured in Caribbean", etc.).

At 406, the computing system processes the first image and the second image with a machine-learned encoding model to respectively obtain a first image embedding and a second image embedding for an image embedding space that includes a plurality of image embeddings. In some implementations, the machine-learned encoding model comprises a machine-learned image transformer model.

At 408, the computing system trains the machine-learned encoding model based on a difference between the first image embedding and the second image embedding. In some implementations, training the machine-learned encoding model includes evaluating a loss function that evaluates a difference between the first image embedding and the second image embedding, and a difference between (a) a pair of image embeddings comprising the first and second image embeddings and (b) the plurality of image embeddings in the image embedding space. For example, evaluating the loss function can include evaluating a contrastive loss function that minimizes the difference between the first image embedding and the second image embedding and maximizes the difference between (a) the pair of image embeddings comprising the first and second image embeddings and (b) the plurality of image embeddings in the image embedding space.

In some implementations, the computing system can further obtain a third image. The computing system can process the third image with the machine-learned encoding model to obtain a third image embedding. The computing system can retrieve a fourth image embedding from the image embedding space based on a similarity between the third image embedding and the fourth image embedding.

In some implementations, obtaining the third image includes obtaining a third image that depicts a rendering of second textual content. Retrieving the fourth image embedding can include retrieving a fourth image embedding from the image embedding space. The fourth image embedding can be based on an image that depicts one or more entities that correspond to the second textual content.

Alternatively, in some implementations, retrieving the fourth image embedding can include retrieving a fourth image embedding from the image embedding space. The fourth image embedding can be based on an image that depicts a rendering of second textual content associated with the third image.

In some implementations, the computing system can further use the fourth image embedding to perform a task. The task can include a textual classification task that classifies textual content depicted by the third image, an image classification task that classifies the third image, a semantic analysis task that generates a semantic output for the third image, an image retrieval task in which the third image includes a plurality of characteristics and the fourth image includes at least a portion of the plurality of characteristics, etc.

In some implementations, obtaining the third image includes obtaining a third image that depicts (a) one or more entities and (b) a rendering of second textual content descriptive of the one or more entities. Additionally, or alternatively, in some implementations, obtaining the third image includes obtaining a third image that depicts (a) one or more entities and (b) a rendering of second textual content descriptive of a query associated with the one or more entities.

In some implementations, the second textual content is further descriptive of a plurality of proposed answers to the query associated with the one or more entities.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for pixel-based machine-learned models for multimodal vision-language tasks, comprising:

obtaining, by a computing system comprising one or more computing devices, a first image and textual content associated with the first image;

rendering, by the computing system, a second image that depicts the textual content associated with the first image as human-readable text;

processing, by the computing system, the first image and the second image with a machine-learned encoding model to respectively obtain a first image embedding and a second image embedding for an image embedding space comprising a plurality of image embeddings; and training, by the computing system, the machine-learned encoding model based on a difference between the first image embedding and the second image embedding.

2. The computer-implemented method of claim 1, wherein training the machine-learned encoding model comprises:

evaluating, by the computing system, a loss function that evaluates:

a difference between the first image embedding and the second image embedding; and a difference between (a) a pair of image embeddings comprising the first and second image embeddings and (b) the plurality of image embeddings in the image embedding space.

3. The computer-implemented method of claim 2, wherein evaluating the loss function comprises evaluating a contrastive loss function that minimizes the difference between the first image embedding and the second image embedding and maximizes the difference between (a) the pair of image embeddings comprising the first and second image embeddings and (b) the plurality of image embeddings in the image embedding space.

4. The computer-implemented method of claim 1, wherein the first image comprises a rendering of additional textual content different than the textual content associated with the first image.

5. The computer-implemented method of claim 4, wherein the additional textual content is written in a first language, and wherein the textual content associated with the first image is written in a second language different than the first language.

6. The computer-implemented method of claim 1, wherein the textual content is descriptive of the first image.

7. The computer-implemented method of claim 1, wherein the method further comprises:

obtaining, by the computing system, a third image;

processing, by the computing system, the third image with the machine-learned encoding model to obtain a third image embedding; and retrieving, by the computing system, a fourth image embedding from the image embedding space based on a similarity between the third image embedding and the fourth image embedding.

8. The computer-implemented method of claim 7, wherein obtaining the third image comprises obtaining, by the computing system, a third image that depicts a rendering of second textual content; and wherein retrieving the fourth image embedding comprises retrieving, by the computing system, a fourth image embedding from the image embedding space, wherein the fourth image embedding is based on an image that depicts one or more entities that correspond to the second textual content.

9. The computer-implemented method of claim 7, wherein retrieving the fourth image embedding comprises retrieving, by the computing system, a fourth image embedding from the image embedding space, wherein the fourth image embedding is based on an image that depicts a rendering of second textual content associated with the third image.

10. The computer-implemented method of claim 7, wherein the method further comprises using, by the computing system, the fourth image embedding to perform a task, and wherein the task comprises:

a textual classification task that classifies textual content depicted by the third image;

an image classification task that classifies the third image;

a semantic analysis task that generates a semantic output for the third image; or an image retrieval task, wherein the third image comprises a plurality of characteristics and the fourth image comprises at least a portion of the plurality of characteristics.

11. The computer-implemented method of claim 7, wherein obtaining the third image comprises obtaining, by the computing system, a third image that depicts (a) one or more entities and (b) a rendering of second textual content descriptive of the one or more entities.

12. The computer-implemented method of claim 7, wherein obtaining the third image comprises:

obtaining, by the computing system, a third image that depicts (a) one or more entities and (b) a rendering of second textual content descriptive of a query associated with the one or more entities.

13. The computer-implemented method of claim 12, wherein the second textual content is further descriptive of a plurality of proposed answers to the query associated with the one or more entities.

14. The computer-implemented method of claim 1, wherein the machine-learned encoding model comprises a machine-learned image transformer model.

15. The computer-implemented method of claim 1, wherein rendering the second image that depicts the textual content associated with the first image comprises:

modifying, by the computing system the textual content associated with the first image to obtain modified textual content; and rendering, by the computing system, a second image that depicts the modified textual content.

16. A computing system for pixel-based machine-learned models for multimodal vision-language tasks, comprising:

one or more processors; and one or more tangible, non-transitory computer readable media storing computer-readable instructions that when executed by the one or more processors cause the one or more processors to perform operations, the operations comprising:

obtaining a first image and textual content associated with the first image;

rendering a second image that comprises the first image and a rendering of the textual content associated with the first image;

processing the second image with a machine-learned image transformer model to obtain an image embedding of the second image for an image embedding space, wherein the image embedding space comprises a plurality of image embeddings generated using the machine-learned image transformer model;

retrieving one or more image embeddings from the image embedding space based on a similarity between the one or more image embeddings and the image embedding of the second image; and using the one or more image embeddings to perform a task associated with at least one of the first image or the textual content associated with the first image.

17. The computing system of claim 16, wherein the textual content associated with the first image is written in a first language, and wherein one of the one or more image embeddings is based on an image that depicts a rendering of textual content written in a second language different than the first language.

18. The computing system of claim 17, wherein the task comprises:

a textual classification task that classifies the textual content associated with the first image;

an image classification task that classifies the first image;

an answer retrieval task that retrieves an answer for a query, wherein the textual content associated with the first image comprises the query; or an image retrieval task.

19. One or more tangible, non-transitory computer readable media storing computer-readable instructions that when executed by one or more processors cause the one or more processors to perform operations, the operations comprising:

obtaining textual content from a requesting entity;

generating an image that depicts a rendering of the textual content;

processing the image with a machine-learned image transformer model to obtain an image embedding of the image for an image embedding space, wherein the image embedding space comprises a plurality of image embeddings generated using the machine-learned image transformer model;

retrieving one or more image embeddings of the plurality of image embeddings from the image embedding space based on a similarity between the one or image embeddings and the image embedding of the image; and providing one or more images respectively associated with the one or more image embeddings to the requesting entity.

20. The computer-implemented method of claim 1, wherein the human-readable text comprises text rendered as image data.

* * * * *